Oct. 2, 1962 H. J. WOOCK 3,056,693
METHOD OF HARD FACING METALLIC ARTICLES
Filed April 7, 1959 3 Sheets-Sheet 1

INVENTOR.
HERBERT J. WOOCK
BY
ATTORNEY

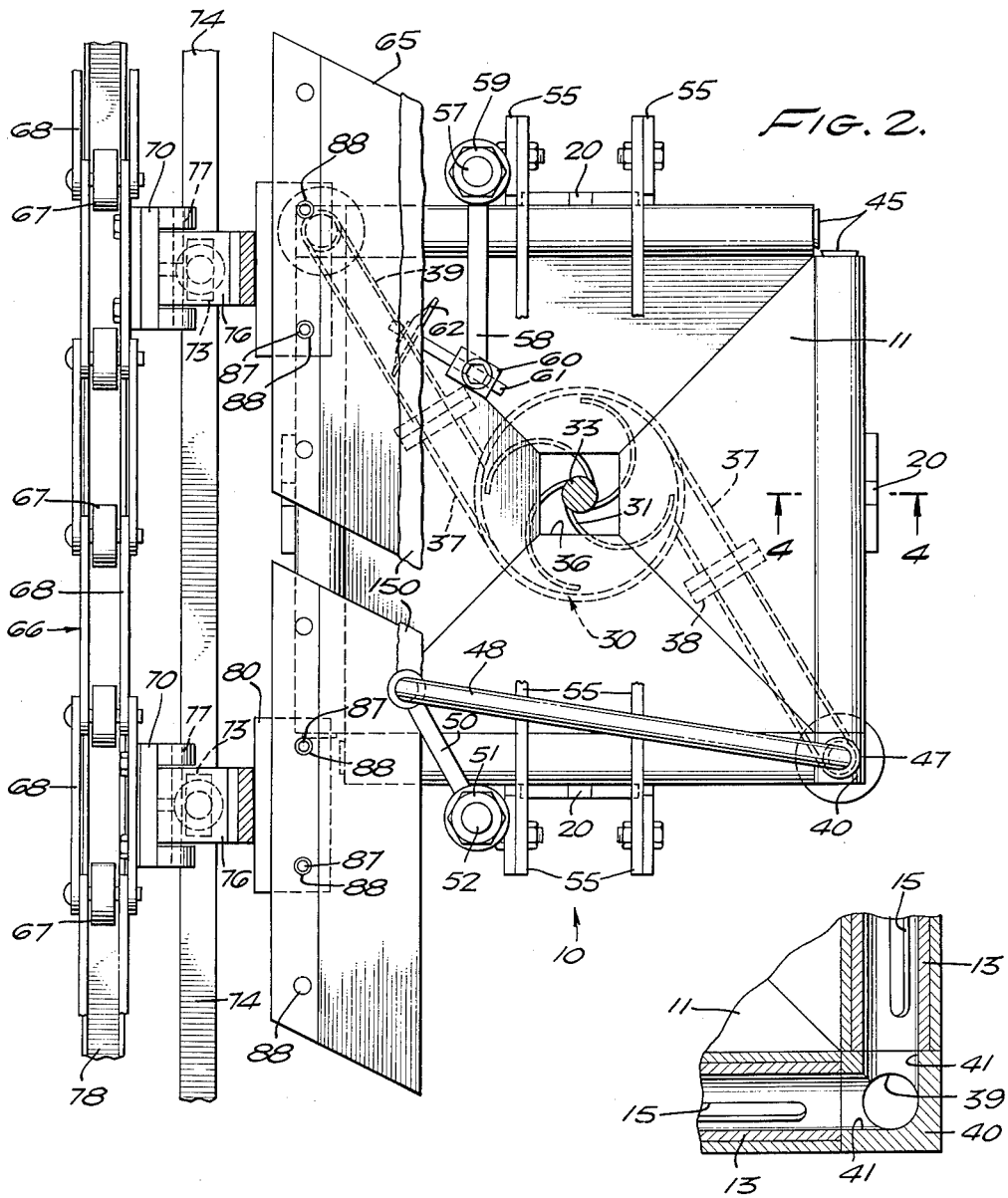
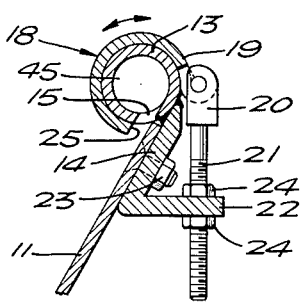

Oct. 2, 1962 H. J. WOOCK 3,056,693
METHOD OF HARD FACING METALLIC ARTICLES
Filed April 7, 1959 3 Sheets-Sheet 3
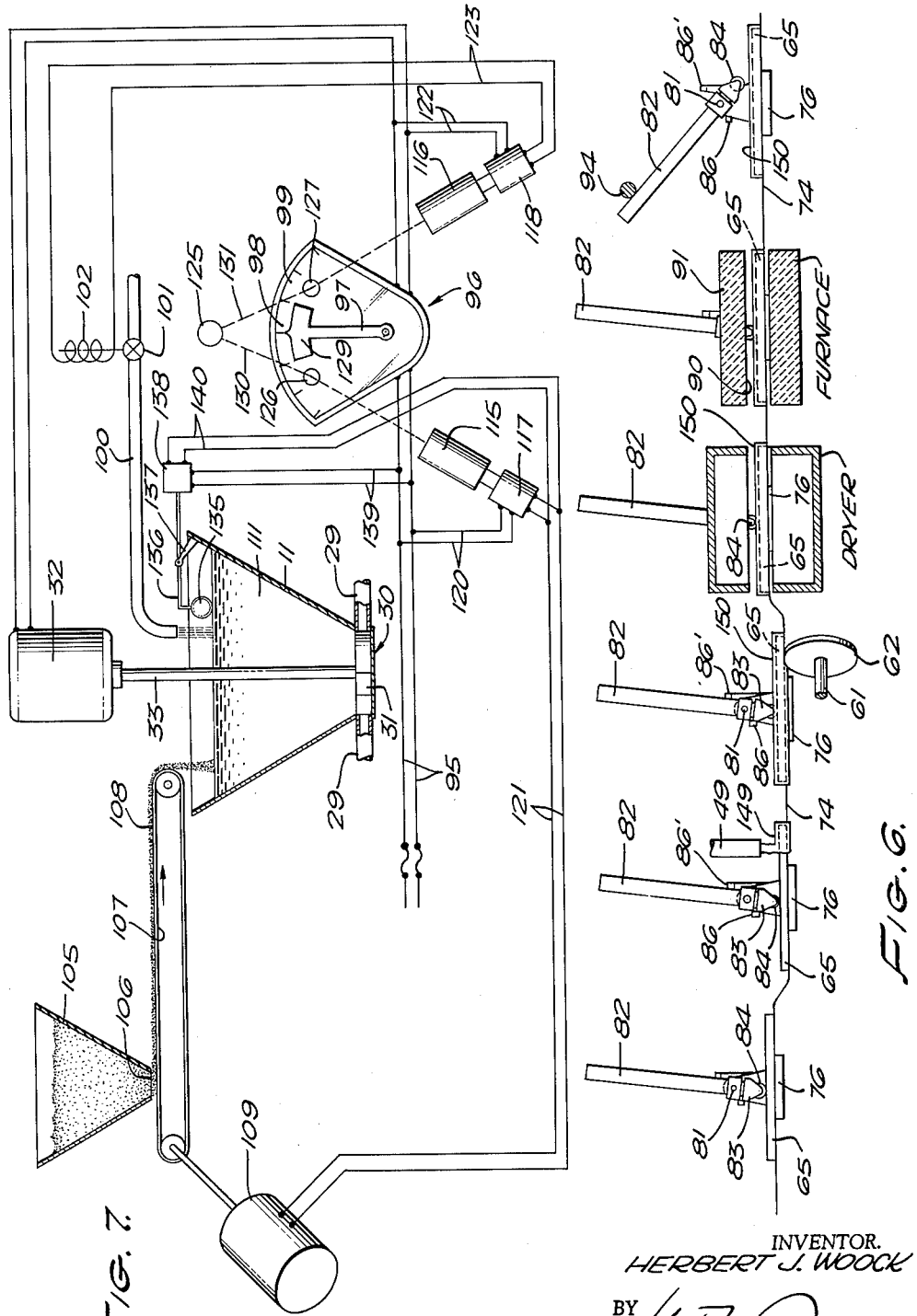

3,056,693
METHOD OF HARD FACING METALLIC ARTICLES
Herbert J. Woock, 420 California St., Arcadia, Calif.
Filed Apr. 7, 1959, Ser. No. 804,647
19 Claims. (Cl. 117—102)

This invention relates to hard facing of metallic articles and more particularly to an improved continuous method and technique by which articles can be hard faced with abrasion resistant refractory coating fused to the base metal under automatic control and by which a wide range of coating thickness can be utilized all without need for separate handling of the articles undergoing coating.

The service life of numerous metallic articles can be increased by a factor of several times if surfaces subject to wear can be specially treated with a coating of hard facing of refactory material highly resistant to abrasion. One of the principal problems attending the hard facing of metal with such protective coatings has been the provision of an easily controlled mode of applying a uniformly distributed layer of the coating without hand labor and without waste of the expensive coating material. Various techniques having as their object the accomplishment of this purpose have been proposed, but these have been subject to various shortcomings and disadvantages avoided by the present invention. For example, my prior Patent 2,611,710, granted September 23, 1952, discloses a hard facing composition formed from two separately prepared alloys. The constituent metals of one alloy are melted together, cast into pigs and then disintegrated into particles of a desired fineness. These particles are mixed with similarly prepared particles of a second and different alloy and mixed in a mixing machine with a suspension agent as an aid in holding the widely different specific gravity materials in suspension while undergoing mixing. The suspension agent or flux floats to the top of the fused metal and is removed as slag. This method has been successful in practice but is time-consuming, laborious and costly.

Another method heretofore used involves forming the hard facing material into a welding rod for use in a welding torch to construct a protective layer of the refactory abrasion resistant material on metal to be protected. This method is likewise laborious and time-consuming. It is, of course, difficult to control the thickness of the layer so welded to the base metal and the surface of the finished coating is unavoidably rough and undulating. For obvious economic reasons, this method has very limited application.

Another method likewise having limited application is to apply the coating with a metal spraygun, followed by subjecting the sprayed article to heating to fuse the metal deposit in place. It has not been found commercially feasible by this method to deposit the thick layers found desirable for many needs. Furthermore, an objectionably high percentage of the costly spray material collects on guards and other devices used to control the spray issuing from the applicating nozzle and is lost.

With the above mentioned and other shortcomings and disadvantages of prior coating techniques in mind, it will be understood that it is a primary object of the present invention to provide a greatly improved method of maintaining a supply of special coating mixture so manipulated as to avoid the slightest tendency of the constituents to stratify, as well as a mixture adapted to be applied directly to the area to be protected in a layer of a desired thickness without migrating while the coating is being fused intimately to the base metal. The present method not only maintains a substantially constant supply of the coating mixture but provides a simple and effective means for returning directly to the main mix surplus material not required in forming the uniform layer on the article being coated.

To insure that the mixture supply remains of a uniform consistency and viscosity, there is provided a mode of introducing selectively additional liquid vehicle and dry constituents in the quantities required to maintain a predetermined reserve of mix at a desired viscosity. According to a preferred mode of checking viscosity, the power required to drive a mix circulating pump is found to vary so precipitantly with changes in viscosity as to provide an excellent mode of operating sensing devices controlling the supply of constituents to the mix. An increase in the power requirements indicates an increase in the mix viscosity, whereas a decrease in the power consumption indicates a decrease in the mix viscosity. A substantially constant reserve supply of the mixture is assured by means of a level control switch operable to shut off the supply of constituents when the level reaches a predetermined point and to renew the supply of constituents when the level falls.

An important feature of the invention relates to the means provided for continuously recirculating the mixture to prevent stratification of the widely varying specific gravities of the constituents. Mix is continually withdrawn from the bottom of a containing hopper and elevated to the hopper rim and there cascaded into the peripheral edges of the main mass container from a distributing manifold surrounding the entire hopper. The rapidly falling layer of the mixture cascading downwardly over the inner surfaces of the hopper successfully prevents the formation of encrustations and drying deposits at the peripheral edges of the mixture by continually entraining the surface layer and circulating it downwardly into the mixture. Recirculation of the entire mix is accomplished rapidly and preferably every ten to fifteen seconds. Assurance is thereby provided that all constituents, including the very heavy carbides, will be prevented from stratifying. A portion of the recirculating streams are diverted to an applicating station overlying the hopper, the diverted stream discharging downwardly into the hopper in an open stream. The article to be coated is then conveyed transversely of this open stream at a rate to deposit a layer of the thick creamy mixture to be distributed to the desired thickness without objectionable tendency to spread beyond the area desired to be coated. By suitable adjusting means both the thickness and the width of the layer can be readily controlled. Further control is provided by varying the viscosity of the mixture and by varying the inclination of the surface being coated to the horizontal. Once the article has been coated, it is held in a substantially horizontal position while the liquid vehicle is being evaporated and while the coating is being fused to the base metal.

Another important feature of this invention is the provision of a hard facing mix consisting of not in excess of 80 percent by weight of carbides at least 45 percent of which are too coarse to pass an 80 mesh screen and at least 55 percent of the entire mixture, including base metals and fluxes, will pass a 100 mesh screen. Mixed with these carbide powders are other powdered metal suitable for bonding the carbides rigidly in place against the base metal of the article being coated. A special flux is also employed not appreciably in excess of 3 percent by weight of the mix and a suitable liquid vehicle, preferably water, ranging between 3 and 8 percent by weight and sufficient along with the fluxing agent to form a thick creamy consistency mix having marked lubricity properties.

These and other more specific objects will appear upon reading the following specification and claims and upon considering in connection therewith the attached drawings to which they relate.

Referring now to the drawings in which a preferred embodiment of the invention is illustrated.

FIGURE 2 is a top plan view of the apparatus shown in FIGURE 1, the pump motor and part of its supporting structure being broken away and omitting certain details of the clamping structure supporting the article being coated;

FIGURE 4 is a cross-sectional view on an enlarged scale taken along line 4—4 of FIGURE 2;

FIGURE 5 is a fragmentary sectional view on an enlarged scale taken along line 5—5 on FIGURE 1;

FIGURE 6 is a schematic view representing the conveyor system for conveying the articles being coated past the applicating station and through the fusing furnace; and FIGURE 7 is a schematic view of the automatic control for controlling recirculation of the mix and the viscosity thereof.

Figures 1, 3:
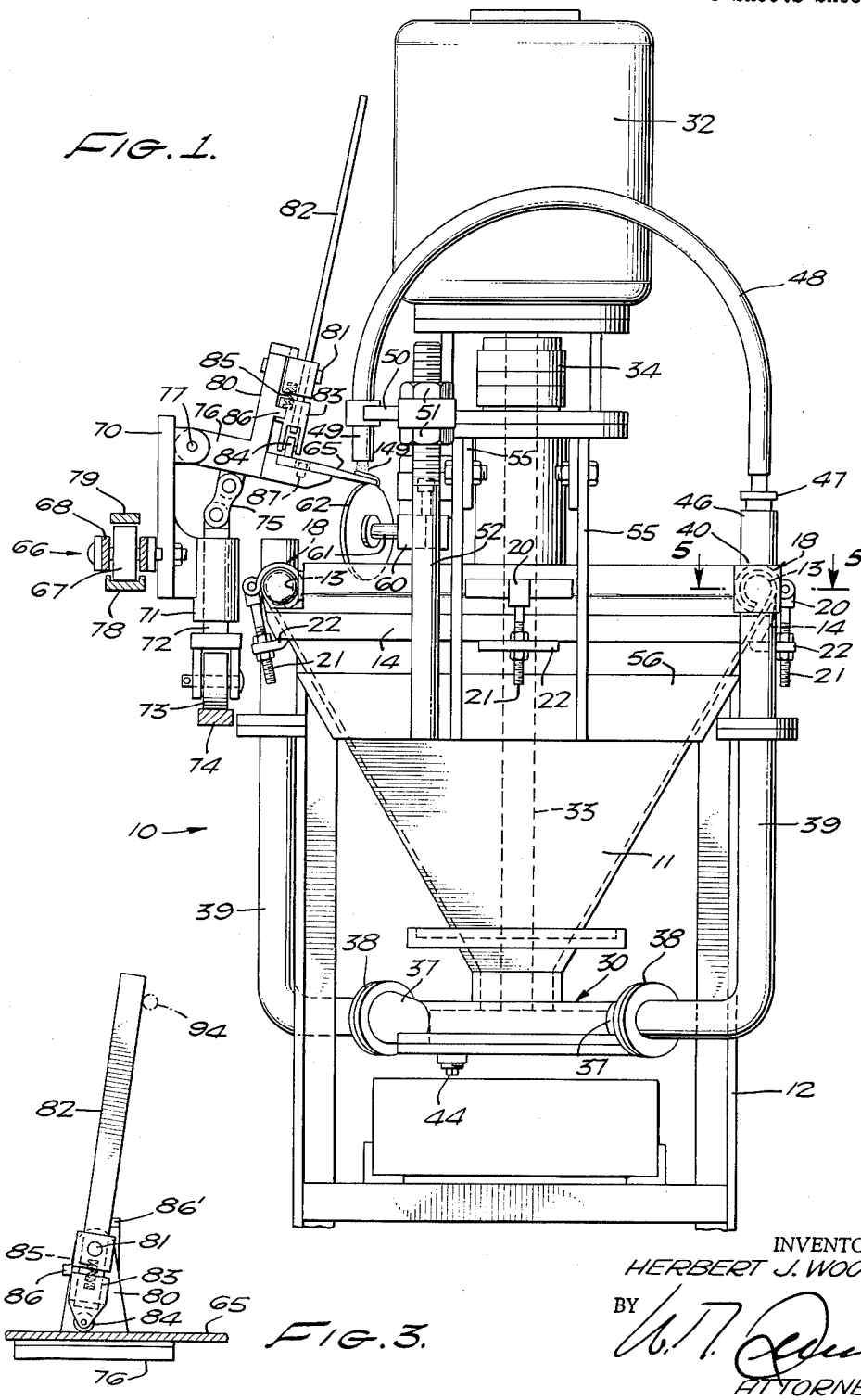
FIGURE 1 is a side elevational view partly in section of mixing and coating apparatus conveniently used in practicing the hard facing technique of the present invention.
FIGURE 3 is a side elevational view partly in section of the clamping means used to clamp an article to be coated to the conveyor.

It will be understood that the continuous coating and hard facing technique constituting the present invention may be practiced either by the aid of various devices or by hand controlled manipulations. For uniform results, use is preferably made of apparatus and equipment having the structural features and operating in the manner now to be described in detail.

Referring first to FIGURES 1 and 2, there is shown apparatus designated generally 10 operable to maintain a predetermined supply quantity of the mixture, the major portion of which is in continuous circulation to prevent stratification of the various constituents. The apparatus serving this purpose includes a funnel-shaped hopper such as the inverted pyramidal hopper 11 having its upper end supported by any suitable rectangular framing, such as that indicated at 12. The upper rim edges of hopper 11 are preferably provided with removable tubes 13 securable to the inner rim of the hopper lip as by bracket 14 and bolts 23 (FIGURE 4). Each tube 13 is provided with a coating mixture outlet slit 15 which extends substantially about the entire periphery of the hopper rim and provides a distributing manifold for the recirculated mixture as will be described more fully presently.

As is best shown in FIGURE 4, the outlet of the mix distributing manifold may be controlled by an arcuate valve member 18 journalled rotatably about tube 13 with its outer edge 19 pivotally connected to a yoke 20. This yoke has a threaded stem 21 extending downwardly through a flange 22 protruding from lugs 14 and secured to the side wall of the hopper as by bolt and nut assembly 23, stem 21 being held in any adjusted position relative to flange 22 as by lock nuts 24, 24. When valve member 18 is adjusted to the position shown in FIGURE 4, outlet slit 15 is fully open and edge 25 of the valving member is co-extensive with one edge of slit 15 in tube 13. However, by adjusting the threaded stem 21 upwardly, valve member 18 is rotated counterclockwise about tube 13 to shift edge 25 closer to the inner surface of hopper 11 thereby restricting outlet slit 15.

The mixture contained within hopper 11 may be maintained in circulation by a centrifugal pump designated generally 30 rotating about a vertical axis and having an impeller 31 (FIGURE 2) driven by a motor 32 coupled to impeller shaft 33 through a suitable coupling 34. Pump inlet eye 36 opens upwardly centrally into hopper 11. The periphery of the pump casing is preferably provided with a plurality of outlet ducts 37 (FIGURE 2) connected through couplings 38 with riser ducts 39. Riser ducts 39 open into elbows 40 (FIGURE 5) at the diametrically opposed corners of the hopper rim and have discharge outlets 41 opening respectively into the oppositely extending portions of manifolds or tubes 13. Pump 30 is preferably so secured to the lower end of hopper 11 as to be removable therefrom as a unit. The lower end wall of the pump casing is also provided with a drain plug 44 to facilitate flushing and cleaning of the equipment after a period of use.

In the above described arrangement of pump 30 and of hopper 11, it will be understood that the two streams of mixture discharging from the pump are delivered to diametrically opposed rim portions of the hopper 11 and there divided into two streams flowing in opposite direction from the distributing elbow 40. The ends of tubes 13 remote from elbows 40 are normally closed by expandable rubber stoppers 45 which may be readily removed to facilitate cleaning of the tubes.

One of the elbows 40 preferably includes an upstanding hollow conduit 46 seating a nipple 47 having its upper end coupled to a flexible mixture distributing hose or gooseneck 48 having an outlet end 49 opening downwardly toward the hopper at a mixture applicating station to be described more fully presently. End 49 of the gooseneck is supported adjustably by an arm 50 having its other end swively supported between a pair of positioning nuts 51 mounted on a threaded rod 52 extending upwardly from an anchoring in the framework supporting hopper 11. It will be understood that the discharge end of gooseneck 48 can be vertically adjusted along rod 52 as well as swung in an arc about bushing 47 to the extent permitted by supporting arm 50.

Motor 32 driving centrifugal circulating pump 30 may be supported in any suitable manner above the top of hopper 11, as by framework 55 having its lower end rigidly secured to a hopper supporting ring 56.

Another feature comprises an adjustable support for a wiper disc to remove excess coating material from the article coated. For this purpose there is a threaded post 57 (FIGURE 2) having its lower end anchored to hopper supporting ring 56 and extending vertically above the hopper on the opposite side thereof from threaded rod 52. Adjustably supported on threaded rod 57 is an arm 58 likewise similar to swinging arm 50 controlling the position of gooseneck 48. Arm 50 is held in any adjusted position along rod 57 by lock nuts 59 and has adjustably secured to its outer end a coupling 60 supporting a shaft 61 of an idling rubber wiper disc 62. The soft rim of this disc is engageable with the lower edge of an article being coated to wipe away surplus coating for discharge back into hopper 11 in the manner best illustrated in FIGURE 6.

A suitable conveyor mechanism for rigidly supporting the articles to be coated with hard facing while transporting them past the applicating station and through the fusing furnace will now be described, particular reference being had to FIGURES 1, 2 and 6. The conveyor there shown and designated generally 66 is provided with fittings and clamping means operable to clamp trapezoidal shaped plowshares 65 rigidly thereto and includes guide rollers 67 between each pair of links 68. The runs of conveyor 66 extend horizontally and are driven at a desired rate past one rim edge of hopper 11 by a suitable drive.

Rigidly secured to one side of conveyor 66 at spaced points therealong is a rigid bracket 70 having a vertically arranged tubular socket 71 slidably supporting shank 72 of a roller 73 arranged to roll along a track 74 co-extensive with and closely beside conveyor 66. The upper end of shank 72 is connected through a link 75 with the lower side of an article clamping bracket 76 pivotally supported by pin 77 to the upper end of bracket 70.

The upper run of conveyor 66 is maintained at a desired horizontal operating level by means of a pair of parallel trackways 78, 79 between which rollers 67 operate. Trackway 74 is similarly disposed except that the portion thereof adjacent hopper 11 is vertically adjustable over the slight distance required to pivot article supporting bracket 76 through a small angle about pivot pin 77 and between a horizontal position and any desired inclined position. It may be stated in general at this point that the purpose of adjusting the elevation of track 74 is to support the surface of the article 65 being coated at a desired inclination to the horizontal over that portion of its travel in which the coating mixture is being applied. Following application of the hard facing, it is customary and preferred practice to restore the coated surface to a generally horizontal position while passing through the dryer and particularly while being fused to the article being coated. This objective is accomplished by having roller 73 pass over a properly elevated section of trackway 74 while the coated article is passing through the drying and heat fusing operations.

Typical means for clamping and automatically releasing the plowshare 65 to be coated from bracket 76 will now be described, particular reference being had to FIGURES 1, 3 and 6. Bracket 76 includes an upright 80 integral therewith having a pivot pin 81 supporting an operating lever 82. The lower end of this lever extends slidably into a well in a housing 83 having a roller 84 journalled to the lower end thereof and held pressed against the upper surface of plowshare 65 by a stiff spring 85. Stops 86, 86' rigid with upright 80 and located to either side of lever 82 serve to restrict pivotal movement of the lever between the extreme positions indicated in FIGURE 6 and in one of which the plowshare is secured in place and in the other of which it is free to drop. In the first mentioned position, spring 85 is compressed and holds roller 84 pressed firmly against the outer edge of the plowshare thereby locking it assembled to bracket 76 with the locating pins 87 of the bracket extending through the plowshare mounting holes 88 (FIGURE 2).

As rollers 73 supporting pivoting bracket 76 pass beyond the mixture applicating station, it will be understood that trackway 74 includes an upwardly inclined or cam section 74' for elevating roller 73 and attached shank 72 sufficiently to pivot bracket 76 and attached plowshare 65 until the coated surface of the latter lies substantially in a horizontal plane. The plowshare remains so supported while the coating is drying and while the plowshare is conveyed through a slot 90 in the side wall of a fusing furnace 91 provided with suitable heating means for fusing the hard facing to the plowshare. It will be understood that requisite fusing temperature varies depending upon the nature of the coating constituents and the material being coated. The carbide constituents, having melting temperatures far above those of articles normally undergoing hard facing, do not melt but the other metal constituents are selected and compounded to fuse at a temperature compatible with the forming of an intimate fused bond with the article being coated. For example, a suitable fusing temperature for coating steel plowshares of a type hard faced in a most satisfactory manner was found to range between 2025 and 2100 degrees F., a temperature of 2050 degrees F. being the approximate optimum temperature.

After the coated article passes beyond furnace 91, lever arms 82 of the plowshare clamping mechanism pass into contact with a stationary release member, such as release pin 94 (FIGURE 6), which is effective to pivot the lever counterclockwise about pivot pin 81 to rotate roller 84 out of contact with plowshare 65 allowing the plowshare to fall into a receiving hopper or chute.

Referring now to FIGURE 7, a preferred automatic control for maintaining a supply of hard facing at a predetermined viscosity will be described. Power supplied from any commercial source passes through main leads 95 connected to motor 32 of the mixture circulating pump 30. Coupled to supply leads 95 is an ammeter 96 having a pivoting indicator needle 97, pointer 98 of which passes over a scale 99. The means supplying coating constituents to hopper 11 include a liquid supply line 100 for water or other suitable fluid controlled by a normally closed solenoid valve 101 operable to open when coil 102 is energized. Dry constitutents in thoroughly mixed condition are contained in hopper 105 having an outlet 106 opening onto a conveyor belt 107 arranged to discharge dry ingredients 108 into hopper 11. Conveyor 107 is driven by an electric motor 109, the power supply of which is controlled automatically in a manner which will now be described.

As noted above, the power requirements of pump impeller 31 are highly sensitive to the viscosity of hard facing mix 111 contained in hopper 11. This sensitivity is reflected in the power supply for driving motor 32 and is indicated by fluctuations of ammeter needle 97 from a predetermined norm representative of the described optimum viscosity for the hard facing mix. For example, if there is a slight trace of excess water present, the material will require less driving power to operate circulating pump 30 and ammeter needle 97 will pivot to the left from its normal operating position. On the other hand, if there is slight deficiency in the amount of liquid vehicle, the power requirements for motor 32 will rise and ammeter needle 97 will shift to the right as viewed in FIGURE 7. Accordingly, movements of indicator needle 97 to either side of the normal operating position are utilized to control selectively the supply of liquid through line 100 and the supply of dry material by way of conveyor 107.

A preferred mode of utilizing movements of indicator 97 to control the supply of water and of dry material makes use of a pair of photo-electric relays 115, 116 each operative by known components to control power switches 117 and 118, respectively. Switch 117 receives power from main line 95 through leads 120 and, when in closed position, supplies power to conveyor motor 109 through leads 121. Likewise, switch 118 receives power through leads 122, and, when closed, supplies power to solenoid coil 102 through leads 123.

The photo-electric devices 115 and 116 are effective to hold switches 117 and 118, respectively, open so long as a beam of light from a lamp 125 is reflected to the photo-sensitive devices by reflection from a pair of mirrors 126 and 127 positioned closely adjacent the opposite sides of ammeter needle 97 and in the path of movement thereof. Thus, if needle 97 swings to the left, as viewed in FIGURE 7, to indicate diminished power requirements of pump motor 32, the broad head 129 supported by needle 97 interrupts light beam 130 falling on mirror 126 with the result that the photo-electric device 115 operates to close switch 117 to conveyor motor 109 to feed dry material into hopper 11.

On the other hand, if needle 97 swings to the right to interrupt light beam 131 falling on mirror 127, photo-electric device 116 operates to close switch 118 energizing coil 102 to open liquid supply valve 101. Owing to the rapidity with which it is desired that pump 30 recirculate the entire quantity of hard facing 111 at least as fast as once in 10 seconds, the addition of either liquid or dry material to the hopper is sensed almost instantly by pump motor 32 and ammeter 96 with the result that the consistency of the coating mixture is maintained substantially constant by the described simple automatic control mechanism.

Cooperating with the described automatic viscosity control is a simple float control for maintaining a predetermined quantity of hard facing 111 in circulation notwithstanding the application of portions thereof to plowshares 65. Suitable means for this purpose is schematically illustrated in FIGURE 7 as including a float 135 mounted on a pivotally supported arm 136 supported from the upper rim of hopper 11 by a bracket 137. The free end of arm 136 is effective to operate a switch 138 receiving power from line 95 through leads 139. When closed, switch 138 supplies current through leads 140 to operate conveyor motor 109.

It will therefore be recognized that motor 109 can be energized either by the photo-electric control 115, or by float control 135 and switch 138. When the level of material 111 is at a desired maximum, switch 138 opens to discontinue the dry material supply unless there then is an unsatisfied requirement for more dry material to correct a low viscosity condition. In this event, rather unlikely during a period of dry material supply, photoelectric 115 maintains switch 117 closed to continue the operation of motor 109 for the brief interval required to correct the low viscosity condition.

It is pointed out that the properties and constituents of the hard facing mixture preferably used in the coating technique of this invention are important for optimum results. These desirable properties present serious problems as respects mixing, preventing stratification of the constituents and maintaining a viscosity suitable for the application of a layer of the desired thickness on the article to be coated. The use of the harder carbides is highly desirable because of their unusually favorable abrasion resistant properties. However, such materials have a specific gravity almost double that of other metal constituents needed as a bonding agent and for other purposes. A certain percentage of coarse-grained carbide particles are desirable owing to their greater abrasion resistance whereas to help prevent stratification the various metals and fluxes having widely varying specific gravities favors the use of very fine material. Additionally, there are numerous other factors favoring the use of very fine material.

With due consideration given to these various factors, some of which conflict with other factors, it has been demonstrated that highly superior results are obtained by employing powdered tungsten up to a maximum of 80 percent of the mixture by weight. At least 55 percent of the entire mixture should pass a 100 mesh screen and at least 45 percent of the tungsten carbide should be too coarse to pass through an 80 mesh screen. Other abrasion resistant materials in powdered form are selected for their various properties in accordance with principles and techniques well known to persons skilled in this art and forming no part of this invention.

Another important ingredient of the mixture is a suitable flux for preventing oxidation of the powdered material during fusing, for imparting lubricity to the mixture and to act as a suspension agent retarding stratification of the heavier constituents. Three percent of the mixture by weight is represented by the flux. The quantity of flux, however, will be understood to vary with the percentages of the other constituents used; for example, a slightly higher percentage of flux is used with a higher percentage of carbide powder. The flux preferably comprises by weight 85 percent borax, 10 percent boric acid, 5 percent finely powdered dicalate, PG grade. In addition to serving as an anti-oxidant during fusing of the hard facing to the body being coated, the flux being additionally effective as a suspension agent helpful in keeping the constituents in suspension as well as a lubricant to impart a slippery film for the individual particles to minimize abrasive action on the equipment.

The above described powdered materials and the finely powdered flux are preferably initimately mixed while dry by any suitable mixer equipment and stored in supply hopper 105. To prepare the hard facing mix for application, pre-mixed dry materials are fed by conveyor 107 into the mixing hopper 11, a small amount of water being gradually added while pump 30 is operated to circulate the materials through conduits 29 and distributing manifolds 13, 13 back into the top of the hopper. Initially, it is desirable to add a slight excess of water in order to assure free circulation and non-clogging of the pump and distributing outlets. However, care must be exercised to avoid adding excess water particularly as the hopper approaches filled condition. Owing to the fact that a minimum quantity of liquid vehicle is desirable when flooding onto articles undergoing coating, a liquid content ranging between 3 and 8 percent of the mixture by weight, depending upon the consistency desired in the finished coating product, is found highly satisfactory.

The operation of the described equipment to practice the applicating technique constituting the present invention will be generally understood from the foregoing description of structure conveniently employed in practicing the technique. Accordingly, only a brief resume is necessary. Assuming that a normal supply of hand facing 111 is present in hopper 11 and that at least some of the clamping assemblies carried by conveyor 66 are loaded with plowshares 65 to be coated in a narrow strip along their cutting edges, light source 125 of the control equipment is energized activating the automatic control mechanism to maintain the viscosity of the mix constant as well as to replace the supply of constituents as used by application to the edges of the plowshares.

Operation of pump 30 continually withdraws large streams of the mix from the bottom of the hopper and recirculates these upwardly through risers 39, 39 and into the upper corners of the diametrically opposed rim portions of hopper 11. The streams there divide for flow laterally along mixture distributing manifolds or tubes 13 from which they cascade in thin layers downwardly over the interior surfaces of the hopper through controlled exit slits 15 extending substantially the full perimeter of the hopper.

The rapidly flowing thin layer of the mixture cascading over the inner surfaces of the hopper prevent the formation of encrustations of the mix at the junction of the hopper contents with its side walls. Such encrustations have a tendency to grow gradually in size and to become quite hard as they dry. Eventually chunks of the encrustation become dislodged and entrained with mixture being withdrawn from the bottom of the hopper. Such highly undesirable possibilities are entirely avoided by the described expedients in which the rapidly recirculating mixture is continuously cascaded over the hopper walls in a manner continuously entraining the exposed surface layer of the mix carrying it downwardly into the body of the mix thereby positively preventing the formation of dry layers or portions of the mix at any point and maintaining the complete mass in constant movement.

A small portion of one of the recirculating streams is diverted upwardly through coupling 46, bushing 47 and into gooseneck 48 for flow to the flooding or applicating station overlying the advancing plowshares. The open stream of hard facing 149 (FIGURE 6) is delivered as a narrow thick band 150 parallel to the cutting edge of the plowshare. It will be understood that prior to passing beneath the distributing gooseneck 48, 49 the edges of the plowshares to be coated are preferably sandblasted or otherwise pretreated to remove moisture scale, rust, grease and all foreign matter to insure the formation of an excellent fused bond between the layer and the base metal of the plowshare after it reaches the furnace.

One manner of controlling the thickness of the layer applied to the edge of any article being coated is by adjusting the tilt of coated surface to the horizontal, it being found that the falling stream 149 (FIGURE 6) of mixture has an increasing tendency to wash away a greater percentage of the layer deposit as the angle of tilt increases. If the tile angle is small substantially the entire stream 149 is deposited to form a thick layer whereas greater and greater portions are carried back into the hopper as the angle of tilt is increased. Normally, excellent results are achieved by tilting the plowshare to the position indicated in FIGURE 1. After the desired angle of tilt is found (usually between 0° and 30° to the horizontal), supporting arm 50 for gooseneck 48 is adjusted by shifting the position of lock nuts 51 along threaded post 52. Once the proper position of outlet 49 of the gooseneck and of arm 50 is found, lock nuts 51 are tightened locking the parts in adjusted position.

Likewise, it is necessary to make a coresponding adjustment of arm 58 supporting wiper disc 62 to the end that this disc will be effective to engage the edge of the plowshare to rotate the disc as the plowshare moves horizontally therepast. In so doing, th disc rotates and wipes away excess mix tending to drain back into hopper 11. The soft ductile rubber wiping disc 62, being wet and smooth, sheds excess mix for discharge back into the hopper for recirculation and reuse at a later time.

After the coated plowshares advance beyond the rim of the hopper, the upwardly cammed surface 74' of trackway 74 for rollers 73 elevates these rollers along their supporting shanks 72 to pivot bracket 76 carrying the plowshares to a horizontal position. The plowshares then pass through a drying station 89 maintained at about 300 degrees F. to remove all moisture after which the plowshares pass into fusing furnace 91 maintained at a much higher and proper fusing temperature such that the bonding constituents merge with the base metal of the plowshare proper rigidly anchoring the hard facing inseparably thereto. As the coated and fused plowshares issue from the furnace, clamping levers 82 sequentially contact stationary means, such as the release pin 94, which is effective to pivot the arms in a direction allowing the plowshares to fall away from the clamping fixture into a receiving hopper, not shown.

From the foregoing detailed description of my hard facing technique and method of preparing and applying the same, it will be recognized that the invention provides a four way control of the deposit thickness, each of which controls is independently adjustable and each of which plays a significant part in the described continuous method of applying hard facing without need for hand labor from the time the articles undergoing their coating are started on their way through the processing stations until the completed article is discharged with a fused layer of hard facing. Separately controlled and adjusted are:

(1) The viscosity of the hard facing mixture;
(2) The angle of the surface being coated with respect to the horizontal;
(3) The speed with which the article traverses the falling stream of hard facing; and
(4) The volume of the falling stream of hard facing.

For example, it will be understood that a higher viscosity mixture assures a heavier deposit whereas a lower viscosity mixture results in a lighter or a thinner deposit. Likewise, increasing the angle of tilt when applying a stream to an edge of an article results in a greater proportion of the stream being carried away or washed back into the hopper. Likewise, slowing the speed at which the article traverses the stream increases the thickness of the deposit whereas increasing the speed of traversal decreases the thickness of the deposited layer. Likewise, increasing the volume of mixture flow onto the article tends to increase the thickness whereas decreasing the flow volume decreases the thickness of the deposit.

In this connection it is pointed out that the volume of the stream may be readily varied by adjusting the proportion of the circulating stream allowed to cascade back into the hopper through slits 15. When these slits are fully opened, as they are in the showing of FIGURE 4, a minimum size stream 149 of coating issues from gooseneck 48. On the other hand, if the flow controlling members 18 to either side of gooseneck supply coupling 46 are closed to reduce the size of slits 15, a larger proportion of the stream flowing in riser 39 is diverted to gooseneck 48 for application to the article being coated.

As will be appreciated from the foregoing, each of the described four modes of controlling the deposit thickness may be adjusted independently of the others or the individual controls may be adjusted in either direction in a wide variety of combinations to suit the needs of a particular operating condition, it being pointed out that the described hard facing technique constituting the present invention can be used in the widest variety of manners to coat articles of widely varying shapes, sizes and contours with any desired thickness of hard facing. When coating certain articles, for example, it is found necessary to reduce the viscosity to facilitate flow of the material into corners and other confined areas desired to be coated. In such instances it may also be necessary to vary not only the viscosity but the volume speed or tilt angle. Alternatively, it may be found that best results are achieved by properly adjusting the conveyor speed and the tilt angle. The volume of the stream deposited on the article provides a very satisfactory control but, as is true of the other controls, it has definite limitations and it is found that adjustment of the volume is closely related to the viscosity of the mixture.

By properly relating the described four control measures, it has been found easily possible to control the deposit thickness between a thickness of .007 inch up to and including 0.250 inch. The mentioned minimum thickness layer makes it possible to coat about 450 square inches of surface with one pound of mixture.

The described fluxing and suspension agents contribute materially to the results achieved including the ease and accurate control of the coating thickness over an extremely wide range, as well as the lubricity characteristic of the mixture while being prepared, recirculated and applied to an article. These agents are all important in decreasing the tendency of the mixture to stratify or form lumps or large masses. Additionally, these agents contribute importantly to the creamy consistency contributing so much to the results achievable with this invention.

From the foregoing it will be apparent that there has been provided by the present invention a technique for applying hard facing to metal articles which is continuous and free of need for hand labor other than supervisory attention. A constant supply of hard facing of controlled viscosity is maintained at all times and in such manner that all constituents are uniformly distributed and prevented from stratifying. The portion of the mix to be applied to an article is withdrawn from a much larger portion of continuously recirculating mix and is spread over the area to be coated as the mix falls in an open stream back toward the hopper. The thickness of the coating layer applied to the article is controlled by the viscosity, the volume of the stream discharged onto the article, the tilt of the surface being coated, and by the rate at which the article is passed transversely of the stream.

While the particular method of hard facing metallic articles herein shown and disclosed in detail is fully capable of attaining the objects and providing the advantages herebefore stated, it is to be understood that it is merely illustrative of the presently preferred embodiments of the invention and that no limitations are intended to the details of construction or design herein shown other than as defined in the appended claims.

I claim:
1. That method of protecting a metal article which comprises applying a coating to said article of a cold fluent hard facing mixture of powdered refractory material and powdered bonding metal, flux-suspension agent and a liquid vehicle characterized in that not less than 55 percent of said powdered refractory material by weight will pass through a 100 mesh screen and at least 45 percent of which are too coarse to pass through an 80 mesh screen.

2. That method of coating a metal article with a cold fluent hard facing mixture of powdered refractory material and powdered bonding metal highly resistant to abrasion, flux-suspension agent and a liquid vehicle characterized in that said liquid vehicle comprises not in excess of 8 percent by weight of said hard facing mixture to provide a fluent coating mixture having a thick creamy consistency exhibiting no appreciable tendency to flow, applying a coating of said fluent mixture to the area of a metal article to be coated, and then subjecting said coated article to heat to dry and fuse the coating thereto.

3. A method of preparing a thick creamy fluent mixture of hard facing material for application to a clean dry metal surface which mixture has no appreciable tendency to spread while being flooded onto the metal surface, said method comprising thoroughly mixing a flux-suspension agent with powdered refractory material and powdered bonding metal, at least 55 percent by weight of the entire mixture being fine enough to pass through a 100 mesh screen and at least 45 percent of the refractory material being too coarse to pass through an 80 mesh screen, and thereafter mixing this mixture with not in excess of 8 percent by weight of a liquid vehicle and maintaining the constituents uniformly dispersed by vigorous agitation.

4. That method defined in claim 3 characterized in maintaining the constituents of said mixture uniformly distributed within a container having downwardly converging side walls by continually withdrawing portions of the mixture from the bottom of said container and flowing the withdrawn mixture back into the main body thereof downwardly along substantially the entire perimeter of the inner side walls of said container to flush away, intermix and to recirculate portions of the mixture tending to settle out on the inner side walls of said container.

5. That method defined in claim 3 characterized in maintaining the constituents of said mixture uniformly distributed by continuously withdrawing a portion of the same from a container therefor having downwardly converging side walls and cascading said withdrawn portion back into said container and downwardly over the inner surfaces of said container to flush away heavier constituents of the mixture which tend to settle onto said container side walls.

6. That method defined in claim 5 characterized in varying the recirculation rate of said mixture by restricting the cross-sectional area of the stream permitted to cascade downwardly over the inner side walls of said container.

7. That method of maintaining a mixture of constituents of widely differing specific gravities uniformly dispersed, said method comprising storing said mixture in a vessel having downwardly converging walls, continually withdrawing a stream of the mixture from the bottom thereof, and returning at least portions of said withdrawn stream to the mixture mass by cascading the same downwardly by gravity flow in a wide thin stream distributed over said downwardly converging walls and effective to flush away heavier particles of the mixture tending to settle and collect on the inner surface of said vessel thereby maintaining uniform dispersion of the constituents in the mixture.

8. That method defined in claim 7 characterized in the step of dividing the stream withdrawn from the bottom of the mass into a plurality of streams at least one of which is conducted to a point of use of the mixture, and returning all portions of the withdrawn stream not used to a flooding station immediately overlying the top of said vessel.

9. That method defined in claim 7 characterized in the step of dividing the withdrawn stream into a plurality of streams, conducting each to points appreciably above the top of the mixture mass, directing the flow of at least one of said divided streams onto an article to be coated as the stream flows by gravity back toward the top of the mass, and permitting the remainder of the withdrawn stream to cascade back into the mixture mass in a thin wide stream merging with the mixture mass along the upper perimeter thereof.

10. That method defined in claim 9 characterized in the step of adjusting the inclination relative to the horizontal of the surface onto which said diverted stream is directed to control the thickness of the coating deposit left on the article being coated with said hard surfacing mixture.

11. That method defined in claim 10 characterized in the step of passing said article bearing a strip layer of hard facing through a heated zone at a temperature effective to fuse said layer to the article.

12. That method defined in claim 7 characterized in that the rate of withdrawal from the bottom of said mixture mass is sufficient to recirculate the entire mass once in a time period not to exceed 15 seconds thereby to counteract stratification of the mixture which otherwise occurs.

13. That method defined in claim 7 characterized in the step of controlling the viscosity of said mixture mass by adding liquid and non-liquid constituents thereto selectively and in quantities as necessary to maintain substantially constant the thick creamy consistency thereof.

14. That method of providing selected areas of a metal article with a fused coating of an abrasion resistant mixture applied as a fluent layer and thereafter intimately fused to the base metal, said method comprising passing the selected area of a metal article to be coated transversely of a continually recirculating stream of the coating mixture and at a rate so related to the volume of the recirculating stream as to deposit a layer of the desired thickness on the metal article, said layer of fluent mixture having a thick creamy consistency which resists flow except to the extent providing a coating layer of substantially uniform thickness, and subjecting the coated article first to a low drying temperature and then to a higher temperature adequate to fuse said layer intimately to the underlying base metal.

15. That method defined in claim 14 characterized in that said coating layer is applied to the metal article in a long narrow strip immediately adjacent and across one edge of the metal article to provide said article with a continuous strip of fused coating material.

16. That method defined in claim 14 characterized in that the step of controlling the consistency of said fluent mixture to maintain the thick creamy nature thereof by adding liquid and dry constituents selectively and in the necessary quantities of each.

17. That method defined in claim 16 characterized in adding quantities of the liquid and dry constituents of said coating mixture selectively in response to a decrease and an increase from predetermined values of the power requirements to maintain said stream of the coating mixture in circulation.

18. That method of coating an article with a fluent mixture of hard facing which method comprises, maintaining a fluent mixture of hard facing utilizing a liquid vehicle to control the viscosity thereof, circulating a stream of said hard facing mixture past an applicating station in an open falling stream, passing articles to be coated through said falling stream, with the upper surface thereof inclined to the horizontal, and controlling the quantity of the coating deposited on the article by selectively controlling the viscosity of the mixture, the volume of the falling stream thereof, and the speed and the angle of inclination at which the article being treated with hard facing is passed through said falling stream.

19. In a method of hard facing metals with a fluent coating highly resistant to abrasion and consisting essentially of powdered refractory and powdered metals and a flux agent characterized in that said powdered metals and flux agent have distributed therethrough a liquid vehicle in proportions not in excess of 8 percent by weight of the remaining constituents and providing a fluent coating mixture adapted to be readily pumped in a confined stream to a coating station, said method including pumping said fluent coating mixture through a main circuit by-passing said coating station and diverting a portion of said fluent coating mixture through a path extending to said coating station and there flooding said portion of the fluent coating mixture onto an article to be coated.

References Cited in the file of this patent

UNITED STATES PATENTS

| | | |
|---|---|---|
| 242,649 | Howes | June 7, 1881 |
| 2,022,481 | Schellenger | Nov. 26, 1935 |
| 2,671,647 | Wolpert | Mar. 17, 1952 |
| 2,674,256 | Ullman | Apr. 6, 1954 |
| 2,674,542 | Alexander et al. | Apr. 6, 1954 |
| 2,714,563 | Poorman et al. | Aug. 2, 1955 |
| 2,718,471 | Samler | Sept. 20, 1955 |
| 2,775,531 | Montgomery | Dec. 25, 1956 |
| 2,877,929 | Ireland | Mar. 17, 1959 |

FOREIGN PATENTS

| | | |
|---|---|---|
| 1,029,895 | France | June 8, 1953 |
| 318,524 | Switzerland | Feb. 28, 1957 |

UNITED STATES PATENT OFFICE
CERTIFICATE OF CORRECTION

Patent No. 3,056,693                          October 2, 1962

Herbert J. Woock

It is hereby certified that error appears in the above numbered patent requiring correction and that the said Letters Patent should read as corrected below.

Column 12, line 3, for "surfacing" read -- facing --.

Signed and sealed this 2nd day of April 1963.

(SEAL)
Attest:

ESTON G. JOHNSON                                  DAVID L. LADD
Attesting Officer                                      Commissioner of Patents